(12) United States Patent
Ceylan et al.

(10) Patent No.: US 8,880,390 B2
(45) Date of Patent: Nov. 4, 2014

(54) LINKING NEWSWORTHY EVENTS TO PUBLISHED CONTENT

(75) Inventors: Hakan Ceylan, San Francisco, CA (US); Ergin Elmacioglu, San Jose, CA (US); Meryem Pinar Donmez, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 335 days.

(21) Appl. No.: 13/331,215

(22) Filed: Dec. 20, 2011

(65) Prior Publication Data

US 2013/0158981 A1 Jun. 20, 2013

(51) Int. Cl.
*G06F 17/27* (2006.01)

(52) U.S. Cl.
USPC ................................ 704/9; 704/1; 704/10

(58) Field of Classification Search
CPC ......... G06F 17/27; G06F 17/28; G06F 17/30; G06F 17/17; G06F 17/2785
USPC ..................... 704/1, 9, 10; 715/254
See application file for complete search history.

(56) References Cited

U.S. PATENT DOCUMENTS

| | | | | |
|---|---|---|---|---|
| 7,734,996 B2 * | 6/2010 | Hirata | ........................ | 715/201 |
| 8,019,847 B2 * | 9/2011 | Banks et al. | ................ | 709/223 |
| 8,065,145 B2 * | 11/2011 | Okamoto et al. | ............ | 704/245 |
| 8,315,849 B1 * | 11/2012 | Gattani et al. | ................. | 704/2 |
| 2005/0132420 A1 * | 6/2005 | Howard et al. | ............... | 725/135 |
| 2005/0203970 A1 * | 9/2005 | McKeown et al. | ............ | 707/203 |
| 2009/0119595 A1 * | 5/2009 | Morris et al. | ................. | 715/730 |
| 2010/0121973 A1 * | 5/2010 | Lobacheva et al. | .......... | 709/231 |
| 2011/0087486 A1 * | 4/2011 | Schiller | ............................ | 704/9 |
| 2011/0196670 A1 * | 8/2011 | Dang et al. | ...................... | 704/9 |
| 2012/0046938 A1 * | 2/2012 | Godbole et al. | ................. | 704/9 |
| 2012/0265519 A1 * | 10/2012 | Latendresse | ..................... | 704/9 |
| 2012/0310627 A1 * | 12/2012 | Qi et al. | ............................ | 704/9 |
| 2013/0041652 A1 * | 2/2013 | Zuev et al. | ....................... | 704/8 |
| 2013/0204613 A1 * | 8/2013 | Godbole et al. | ................. | 704/9 |

OTHER PUBLICATIONS

Sankaranarayanan, Jagan, et al. "Twitterstand: news in tweets." Proceedings of the 17th ACM SIGSPATIAL International Conference on Advances in Geographic Information Systems. ACM, 2009.*

* cited by examiner

*Primary Examiner* — Douglas Godbold
(74) *Attorney, Agent, or Firm* — Martine Penilla Group, LLP

(57) ABSTRACT

Methods, systems, and computer programs are presented for linking newsworthy events in a document to published content. One method includes an operation for receiving features by a classifier that is operable to determine a probability of the availability of news for a sentence. When the features are found in the sentence, the probability of the availability of news for the sentence increases, where the sentence includes one or more noun phrases and ends in a full stop. The classifier determines which sentences in a document are candidate sentences for being linked to news articles, and for each candidate sentence, the method includes an operation for finding an associated news article when there is an associated news article exceeding a relevance threshold. Further, the method includes operations for adding links in the document to the found associated news articles, and for displaying the document with the added links.

17 Claims, 8 Drawing Sheets

LINKING NEWSWORTHY EVENTS TO PUBLISHED CONTENT

CROSS REFERENCE TO RELATED APPLICATIONS

This application is related to U.S. patent application Ser. No. 13/298,932, filed Nov. 17, 2011, and entitled "Related News Articles," which is incorporated herein by reference.

BACKGROUND

1. Field of the Invention

The present invention relates to methods for selecting internet content for presentation to a user, and more particularly, methods, systems, and computer programs for adding information sources related to the content of a document.

2. Description of the Related Art

The recent decade has witnessed an explosive growth of online news. According to a recent report, more than 123 million people visited news websites such as Yahoo!™ News in May 2010, representing 57 percent of the total U.S. internet audience, with each visitor reading 43 pages on average. These numbers have been steadily increasing over the past years and show the growing appeal of reading news online.

Recommending interesting news articles to users has become extremely important for internet providers looking to maintain users' interest. While existing Web services, such as Yahoo! and Digg™, attract users' initial clicks, methods to engage users after their initial visit is largely under explored.

One important advantage of online news over traditional newspapers is that the former can be augmented with hyperlinks to other related news. When a user is reading a news article, the user may also be interested in related articles that logically flow from the content of the current page or that provide more details on the current article being read. This process is referred to herein as post-click news recommendation, which has the goal of promoting users' navigation to other web pages. However, if the recommended articles are not logically related to the article being read or provide wrong or duplicate information, the recommended articles will fail to capture user interest, and users' overall satisfaction will decrease.

In some solutions today, finding articles that provide more details on the current article being read is done by editors that search through a corpus of news documents. This process is expensive and cumbersome, and is also limited by the editors' familiarity with the news topics.

It is in this context that embodiments arise.

SUMMARY

Embodiments of the disclosure provide methods, computer programs, and systems for providing internet content, and more particularly, methods, systems, and computer programs for linking a mention of a newsworthy event in a document to a published content such as a news article having information relevant to the mention It should be appreciated that the present embodiments can be implemented in numerous ways, such as a process, an apparatus, a system, a device or a method on a computer readable medium. Several embodiments are described below.

In one embodiment, a method includes an operation for receiving features by a classifier that is operable to determine a probability of the availability of news for a sentence. When the features are found in the sentence, the probability of the availability of news for the sentence increases, where the sentence includes one or more noun phrases and ends in a full stop. The classifier determines which sentences in a document are candidate sentences for being linked to news articles, and for each candidate sentence, the method includes an operation for finding an associated news article when there is an associated news article exceeding a relevance threshold. Further, the method includes operations for adding links in the document to the found associated news articles, and for displaying the document with the added links.

In another embodiment, a method includes an operation for training a classifier utilizing a plurality of features and a plurality of training sentences with associated judgments. The classifier is operable to determine a probability of an availability of news for a sentence, where at least one of the features when found in the sentence increases the probability of the availability of news for the sentence. Further, the classifier determines which sentences in a document are candidate sentences for having available news. The method further includes an operation for finding, for each candidate sentence, an associated news article when the associated news article exceeds a threshold of relevance to the candidate sentence. Links in the document are added to the found associated news articles, and the document is displayed with the added links, where at least one operation of the method is executed through a processor.

In yet another embodiment, a computer program embedded in a non-transitory computer-readable storage medium, when executed by one or more processors, includes program instructions for receiving a plurality of features by a classifier that is operable to determine a probability of an availability of news for a sentence. At least one of the features, when found in the sentence, increases a probability of the availability of news for the sentence, where the sentence includes one or more noun phrases and ends in a full stop. The computer program further includes program instructions for determining, by the classifier, which sentences in a document are candidate sentences for having available news, and program instructions for finding, for each candidate sentence, an associated news article when the associated news article exceeds a threshold of relevance to the candidate sentence. Further yet, the computer program includes program instructions for adding links in the document to the found associated news articles, and program instructions for displaying the document with the added links.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, systems, and computer programs for linking a sentence in a document to a news article having information relevant to the sentence. It will be apparent, that the present embodiments may be practiced without some or all of these specific details. In other instances, well known process operations have not been described in detail in order not to unnecessarily obscure the present embodiments.

Figure 1:
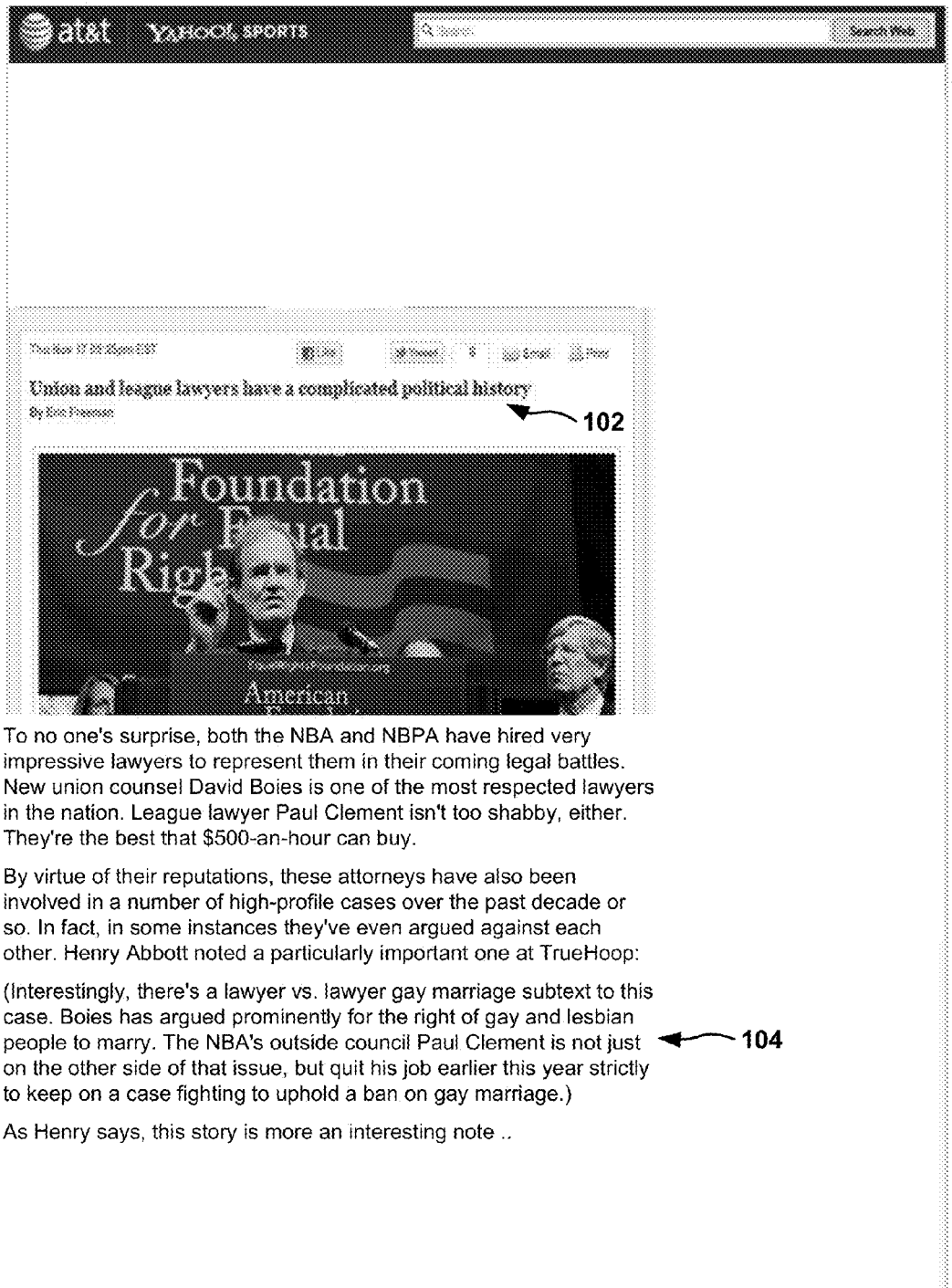
FIG. 1 shows a news article provided by an Internet news service, according to one embodiment.

FIG. 1 shows a news article provided by an Internet news service, according to one embodiment. A typical news article includes, at least, a title 102 and a body 104. The title 102 provides a headline for the article, and the body 104 includes a textual description of the news article. In some cases, the news article may include one or more pictures, and one or more multimedia segments.

Embodiments add links to the sentences in the body 104 of the news article to obtain additional information regarding the sentence in the news article. Embodiments are described with reference to a news article on the website, but embodiments may also be utilized to add links to sentences in any type of document, such as a document on a word processor, a company's website, etc. Additionally, embodiments of the specification describe the process for adding news links to sentences in a document, but other embodiments may utilize the same methods to add links to parts of the sentence, to a paragraph, to a plurality of sentences, etc. It should be appreciated that the embodiments illustrated below are exemplary and should therefore not be interpreted to be exclusive or limiting, but rather exemplary or illustrative.

A parser is utilized to determine sentence boundaries. In general, a sentence is an expression in natural language, and is often defined to indicate a grammatical unit consisting of one or more words that generally bear minimal syntactic relation to the preceding or following words. A sentence can include words grouped meaningfully to express a statement, question, exclamation, request, command or suggestion. A sentence can also be defined in orthographic terms as the words contained between a capital letter and a full stop. In another embodiment, a sentence is defined as the words contained between two full stops. A full stop is one of a period, a question mark, or an exclamation point. Further, a noun phrase (NP), nominal phrase, or nominal group is a phrase based on a noun, pronoun, or other noun-like word which may be accompanied by modifiers such as adjectives.

Figure 2:
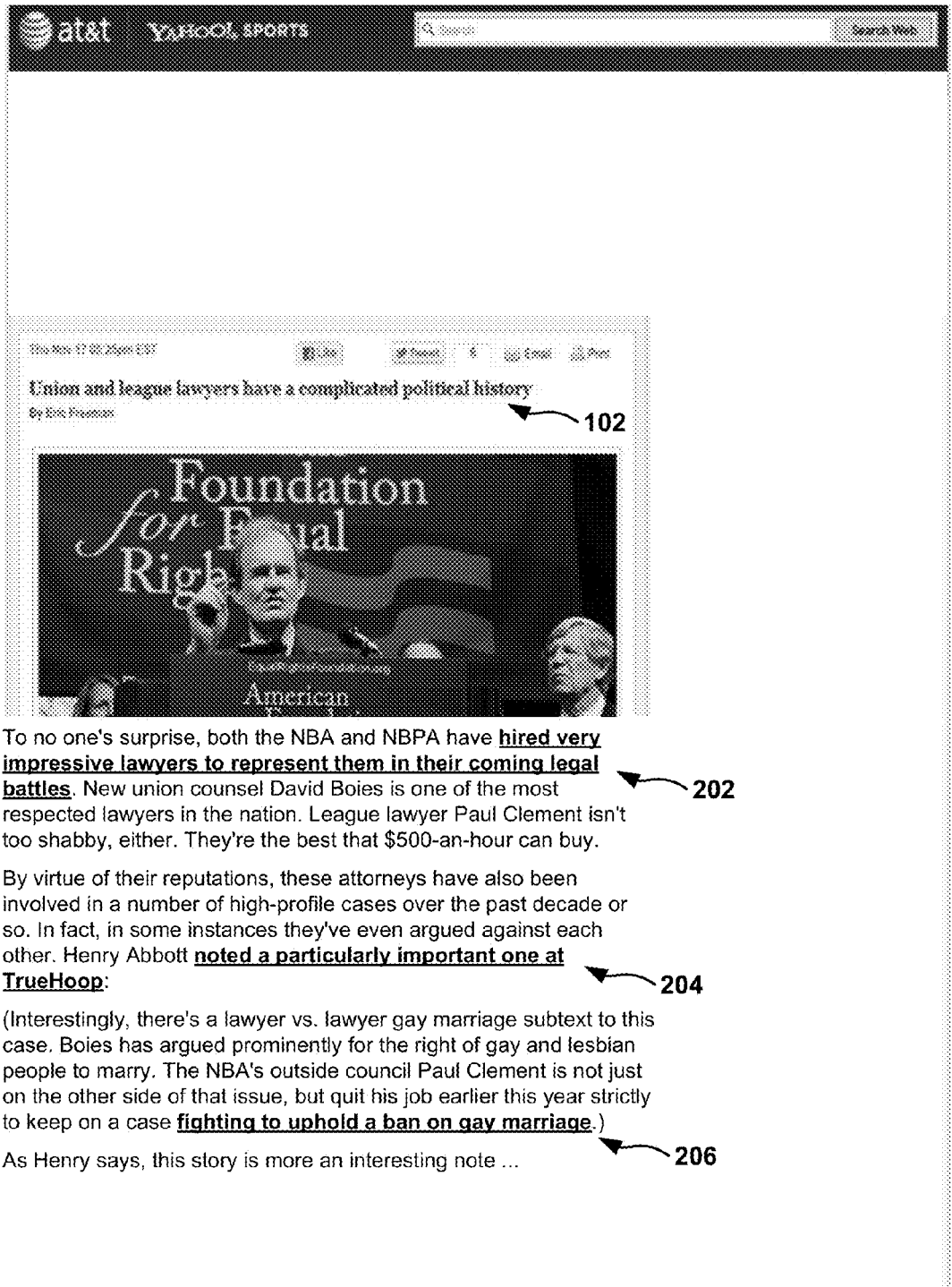
FIG. 2 shows the news article with links to relevant news, according to one embodiment.

FIG. 2 shows the news article with links to relevant news, according to one embodiment. Embodiments automatically detect references to past events in the sentences of a given text, such as a webpage or some other type of document. The document may include a single sentence. For example, a document may include a photograph and a title for the photograph. In one embodiment, the title of the photograph is analyzed, and a news article with relevant information related to the title is identified and added as a link to the title of the photograph.

The added links provide previously published media content that offers additional information to the information found in the sentence. In one embodiment, a portion of the sentence is highlighted and a hyperlink is added pointing to previously published media content. In other embodiments, different parts of the sentence are selected for adding the hyperlink, such as the verb of the sentence, the subject of the sentence, text following the verb, the whole sentence, etc.

In the embodiment of FIG. 2, the system has added 3 links 202, 204, in 206 to the text of the original news article described in FIG. 1. For example, the first sentence of the article specifies the following: "To no one's surprise, both the NBA and NBPA have hired very impressive lawyers to represent them in their coming legal battles." A hyperlink has been added to a part of the sentence "hired very impressive lawyers to represent them in their coming legal battles," which indicates that an older news article has information about the hiring of the lawyers. If the reader selects, e.g., clicks on, the link 202, the browser will load the article with the information about the hiring of the lawyers.

In another example, a news article includes the sentence "The Boston Celtics star announced his retirement from professional basketball yesterday by tweeting a link to a 10-second video." In one embodiment, the phrase "announced his retirement" is highlighted and the associated link, when selected, will take the user to a sports article titled "Shaquille O'Neal announces retirement via Twitter".

The goal is to automatically find an article that matches the described fact or content of the sentence. The article gives more information on a past event. If finding relevant news article is done utilizing human labor, the process is very costly and not scalable to be utilized at the large scale, such as making the process available to millions of users, and for thousands or millions of documents.

In one embodiment, a method includes computer implemented operations to identify possible news articles that can be linked to a sentence. Human judges may then validate whether the possible news articles are valid or invalid. This way, the process for identifying news articles is greatly simplified, enabling human judges to provide links in multiple news articles.

The news articles do not have to be limited to news articles published before the creation of a document. In one embodiment, a document, such as a news article, might be complemented with links that points to news articles published after the document was initially created.

In another embodiment, a graph structure is created based on the hyperlinks for the articles inserted for each sentence. This graph structure can be analyzed to discover relationships between the articles. For example, search engines may benefit from this structure to improve the ranking of search results.

At a high-level, the process for inserting links in sentences of a document is divided into 4 operations:

1. Train the classifier;
2. Detect the candidate sentences in the document;
3. Perform a search for the candidate sentences found; and
4. Compare the search results with the candidate sentence and select the best search result if the search result meets certain criteria.

These operations are described in more detail below with reference to FIGS. 3-5.

Figure 3:
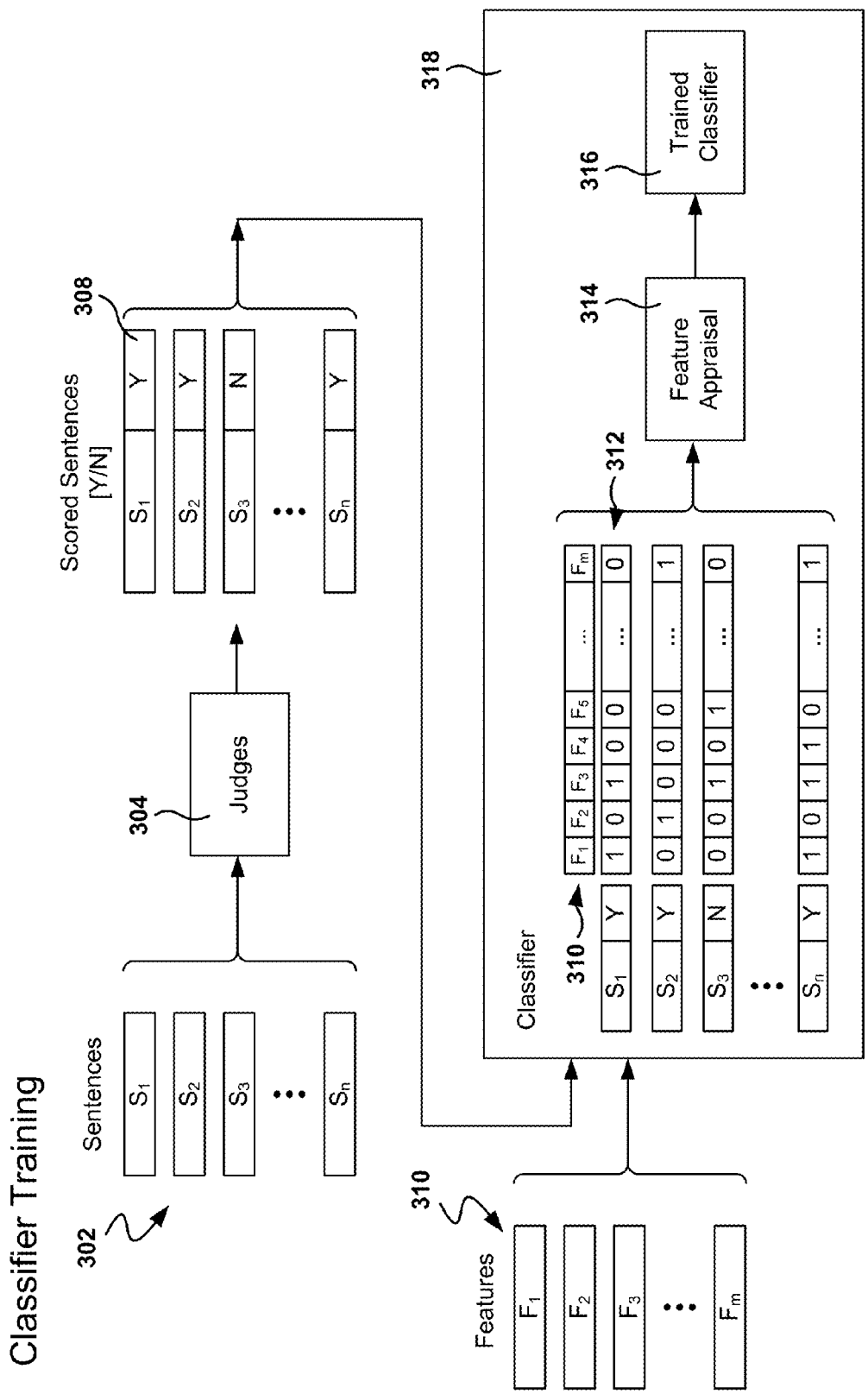
FIG. 3 illustrates the method for training the classifier, according to one embodiment.

FIG. 3 illustrates the method for training the classifier, according to one embodiment. The classifier is a computer program that determines the probability that a sentence has news associated with the meaning of the sentence, where the news provides additional information regarding the sentence. The classifier utilizes machine learning and relevance models to determine which sentences are good candidates for adding links to news articles. In one embodiment, the classifier is a logistic regression classifier.

A plurality of sentences 302 $S_1$-$S_n$ are provided to human judges 304. For each sentence, a judge determines if the sentence is a good candidate for having news associated providing more details. In one embodiment, each sentence is given a binary value 308 (Y/N) indicating if the sentence is a good candidate or not. In one embodiment, the same sentences are given to a plurality of judges and a compound score is obtained for each sentence based on the scores given by each of the judges.

In addition, a plurality of features 310 $F_1$-$F_m$ are defined and input into classifier 318. Each feature, when found in a sentence, increases the probability that the sentence has news articles associated with. Each feature may have a different impact on the calculation of the probability that the sentence has associated means, and during the training phase the classifier determines the relative importance for each of the features.

For example, one of the features is defined as "the sentence contains the word ago." The word "ago" in a sentence is a good indicator that the sentence refers to a past event, and since news articles often refer to events, the presence of the word "ago" increases the probability of a relevant news article. Other features may be selected from the following group:

The Noun Phrase (NP) contains the name of an entity
The ratio of nouns in the NP:

$$ratio = \frac{\text{number of nouns in } NP}{\text{total number of nouns}}$$

The number of stop words in the NP
The number of terms in the NP
The ratio of NPs in the sentence:

$$ratio = \frac{\text{number of } NPs}{\text{total number of } prases}$$

tf-idf of the nouns in the NP
Term frequency of the nouns in the NP
The NP contains a date or a date reference (e.g., a date—Nov. 7, 2011, or January 2011; relative date—last month, Yesterday; name of a month—February; a year—2007; a day of the week—Monday; etc.)
The sentence contains a time related word or a word for measuring time (e.g., ago, days, weeks, months, years, etc.)
NP has capitalized words in the middle of the sentence (e.g., President Obama, John Lennon, Congress)
The normalized distance in terms of the head noun of the NP to the verb of the sentence
The sentence is in the past tense (e.g., the victim was last seen when leaving the supermarket)
The verb refers to an action (e.g., drove, died)
The sentence contains a proper name (e.g. Michael, The Beatles)
The sentence contains the name of a celebrity (e.g., Lady Gaga, Elton John, Michael Jordan)
The sentence contains the name of a media outlet (e.g., NBC, CNN, NY Times, Reuters, etc.)
The sentence contains words indicative of telling a story (e.g., reported, according to, said, announced, indicated, explained, etc.)
The sentence contains words often found in news reports (e.g., accident, car crash, police, lawyer, divorce, press conference, announcement, dollars, stock market, recession, etc.)
The sentence contains the name of a crime or a word related to a crime (e.g., kill, kidnap, assault, robbery, lawyer, bounty, dead, death, injured, hospital, charged, arrested, drunk, etc.)
The sentence contains a title (e.g., President, CEO, Coach, Principal, Doctor, etc.)
The tf-idf weight (term frequency-inverse document frequency) is a weight often used in information retrieval and text mining This weight is a statistical measure used to evaluate how important a word is to a document in a collection or corpus. The importance increases proportionally to the number of times a word appears in the document but is offset by the frequency of the word in the corpus.

Is noted that some words in the sentence might fall into more than one feature category. The list of features as recited about is exemplary, and other embodiments may utilize different features, or a subset of these features. The feature list should therefore not be interpreted to be exclusive or limiting, but rather exemplary or illustrative.

The features 310, the sentences 302, and the sentences scores 308 are input to the classifier 318. For each sentence, the classifier determines if each of the features is present in the sentence 312 (which is represented in the FIG. 3 as a logical value of 1 when a feature is present, and a value of 0 when the feature is missing).

In the future appraisal phase 314, the classifier utilizes machine learning algorithms to compare the presence of each of the features in the sentence with the scores of the sentences. The result of the feature appraisal 314 is a trained classifier 316, which includes an assessment of the value of each of the features $F_1$-$F_m$ for predicting the presence of news in the sentence. In addition, the trained classifier evaluates the importance of finding a combination of features in a sentence.

Figure 4:
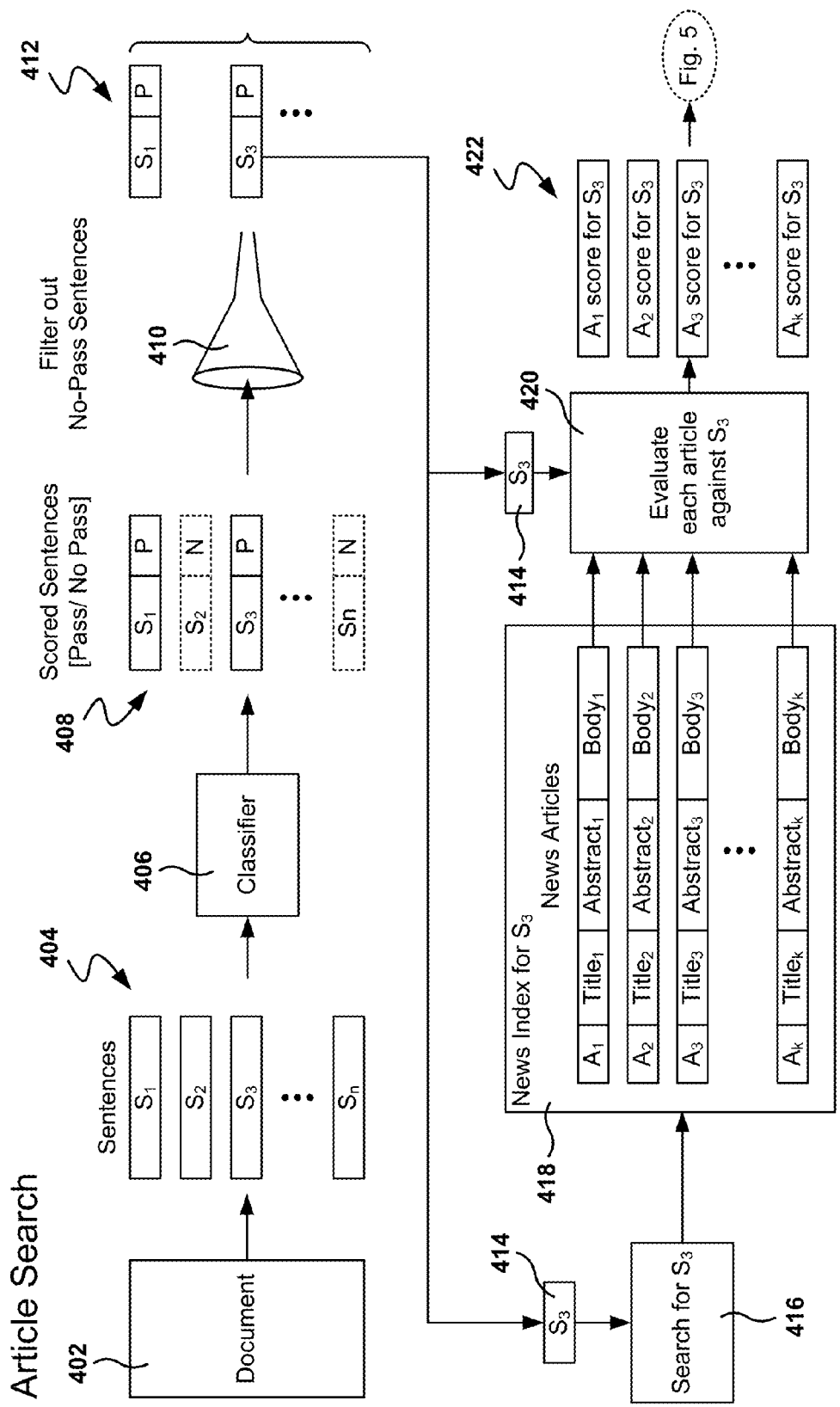
FIG. 4 illustrates the process for finding news articles describing in more detail the content of a sentence, according to one embodiment.

FIG. 4 illustrates the process for finding news articles describing in more detail the content of a sentence, according to one embodiment. A document 402, such as a webpage, is parsed and broken into sentences 404 $S_1$-$S_n$. The sentences 404 are sent to classifier 406, and the classifier, which has already been trained, evaluates each sentence and makes a binary decision, with a certain probability, whether the sentence is a good candidate for having a news article associated with the sentence. The probability value indicates the probability that a previous article exists about the sentence.

As described above, the classifier relies on the features utilized for training to determine the probability that the sentence has a news article associated therewith. In one embodiment, the classifier produces a "Pass" or "No Pass" rating for each sentence. The sentences without "No Pass" rating are filtered 410 out, and the sentences are no longer considered for searching news articles associated with them.

In one embodiment, each sentence is parsed into sentence elements or constituents, such as verbs, nouns, noun phrases, subjects, etc. A dependency parser is utilized to capture the relationships between each constituent. From the analysis of these relationships, the verb, or verbs, of the sentence specifying the event and its relationship to other constituents is obtained. The constituents modifying the verb(s) in the form of single words or phrases can also be properly determined from these relationships, or the relationships among the constituents themselves.

Furthermore, the noun phrases are also analyzed for nouns derived from verbs as these forms of phrases can also be good candidates for events. As a result of this operation, an action phrase for the sentence is formed by taking a part of the sentence that begins at the noun phrase preceding the verb and ends at the noun phrase following the verb, provided that each noun phrase is within a distance of a certain number of words from the verb.

The sentences 412 that received the Pass rating are then evaluated for finding and associated news articles. For simplicity of description purposes, the following operations of the method are described with reference to sentence $S_3$ 414, which received the Pass rating by the classifier, but the same operations apply to other sentences in the document.

In one embodiment, sentence $S_3$ is used as the search text for an Internet News search in operation 416. In another embodiment, the action phrase for sentence $S_3$ is calculated, and the resulting action phrase of sentence $S_3$ is used as the search text for the Internet News search in operation 416. The Internet search produces a news index 418 of articles found by the search engine. In one embodiment, the articles found by the search engine are ranked according to the relevance of the article with regards to the search text ($S_3$).

In one embodiment, the news search engine indexes title and abstract of news articles within a certain time period (e.g., last month). Therefore, the time period for searching articles ends in the present day (e.g., the search takes place) and goes back a predetermined length of time (e.g., one month, three months, one year, etc.). In other embodiments, the body of the news articles is also indexed together with the title and the abstract, and the time period for the search may not be limited, i.e., any news article from the past may be a result for the news search.

In operation 420, articles obtained during the search are evaluated against the sentence 414. In one embodiment, each article is evaluated by comparing the content of the sentence with the title and abstract of the news article. The evaluation may be performed by a word overlap count, but other evaluation methods are also possible such as cosine similarity, Jaccard similarity, and other relevance models. In one embodiment, the words in the title are given a higher weight than the words in the abstract or body of the article for performing the evaluation 420 of the article.

The result of the evaluation 420 produces a plurality of scores 422 $A_i$, one score per article. In one embodiment, the score for an article is normalized to account for the length of the sentence. Based on the obtained scores $A_i$, the articles are ranked 422.

Figure 5:
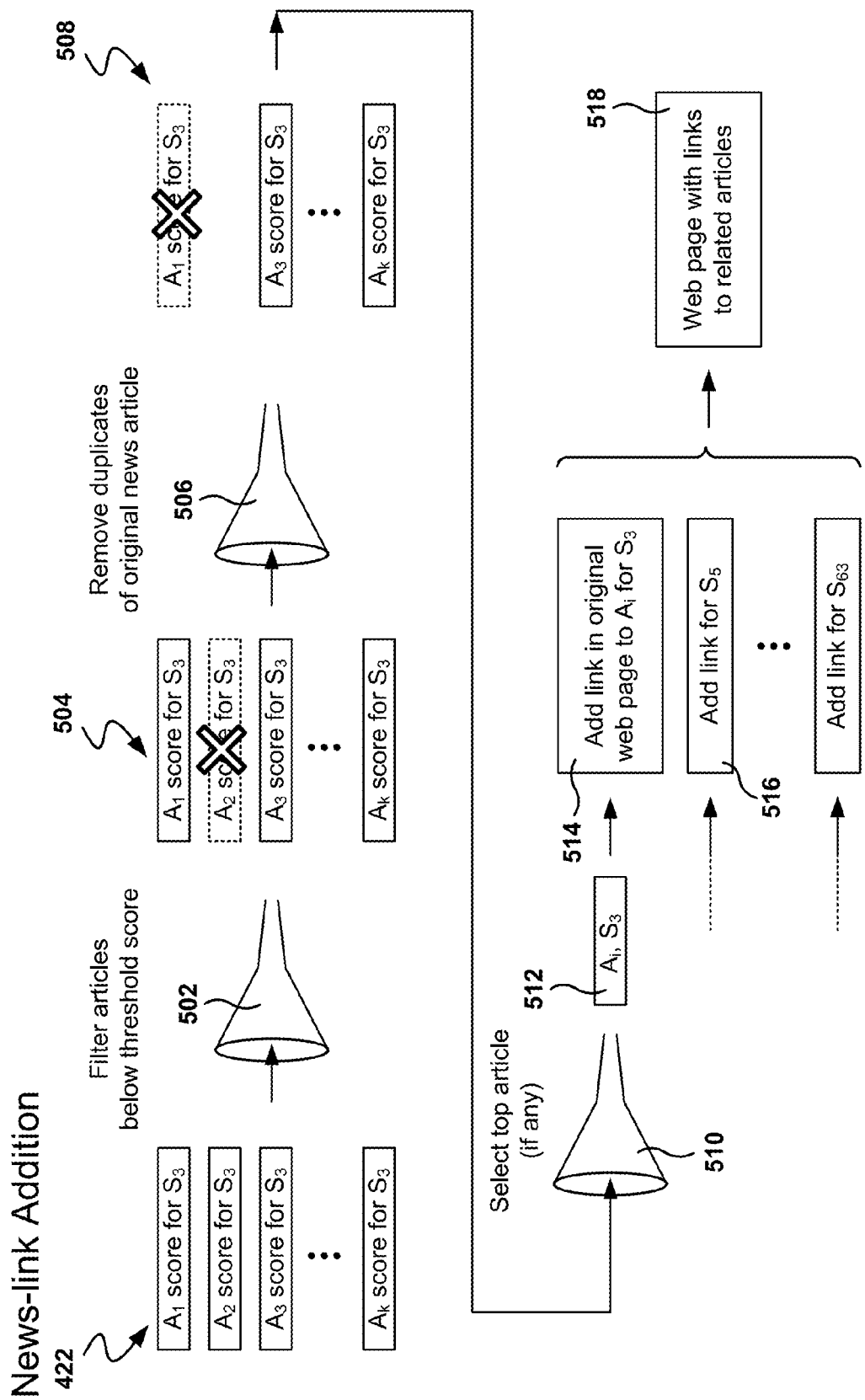
FIG. 5 illustrates the process for adding links to the sentences in a document, according to one embodiment.

FIG. 5 illustrates the process for adding links to the sentences in a document, according to one embodiment. After articles 422 have been scored and ranked, in operation 502, the articles with a score below a threshold level of relevance are eliminated. The result is a set of articles 504 that have a score greater than the threshold score, while those articles below the threshold score have been eliminated (e.g., $A_2$ in the example of FIG. 5).

The threshold score may be adjusted to control the tradeoff between precision and recall (number of articles selected). If the relevance threshold is set high, the system will have a high precision on low recall, and if the relevance threshold is set low, the system will generate a higher number of articles but with a lower precision. In one embodiment, the relevance threshold score is adjusted by utilizing feedback from users or judges regarding the precision of the links added to sentences.

In operation 506, the articles that are duplicates of each other, as well as the articles that are duplicates of the original document that included the sentence, are eliminated. The result is a new set of articles 508 (e.g., article $A_j$ of FIG. 5 is eliminated because it is a duplicate of the original document).

In operation 510, the article 512 with the highest score from the remaining articles 508, if any article still remains in articles 508, is selected for addition to the sentence (e.g. $S_3$). In operation 514 a link, pointing to the selected article with the top score, is added to the corresponding sentence (e.g., article $A_i$ is added to sentence $S_3$). Similarly, links to other found news articles for other sentences are also added to the corresponding sentence (e.g., adding 516 link to sentence $S_5$). Once all the links are added to the document, the document or webpage is displayed 518 to the user with the inserted links.

In one embodiment, the link is added to the action phrase of the sentence, and in another embodiment, the link is added to all the words in the sentence.

It is noted that the embodiments illustrated in FIGS. 3-5 are exemplary. Other embodiments may utilize different search engines, perform operations of the method in a different order, add links to different parts of the sentence, set different criteria for selecting articles, etc. The embodiments illustrated in FIGS. 3-5 should therefore not be interpreted to be exclusive or limiting, but rather exemplary or illustrative.

Figure 6:
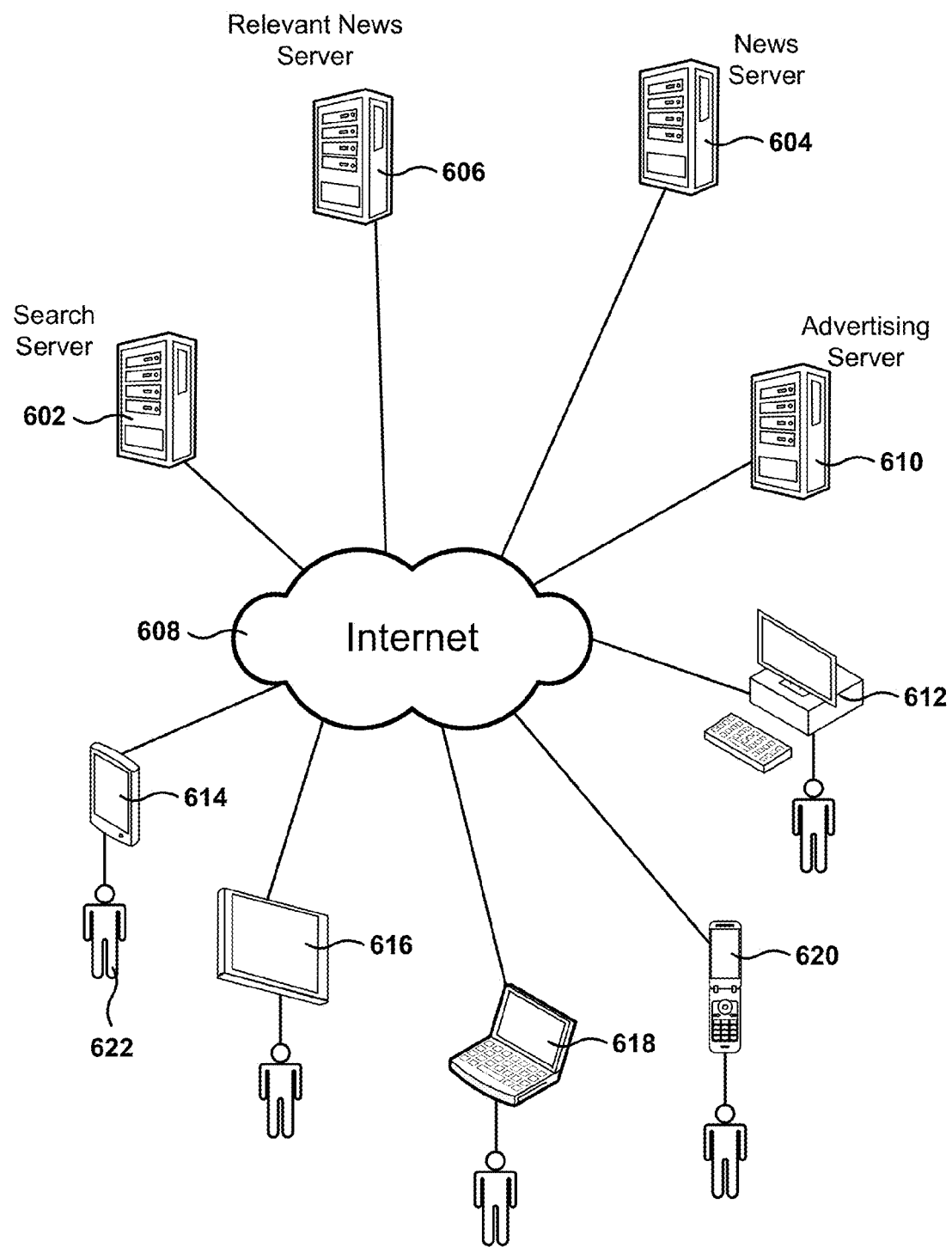
FIG. 6 is a simplified schematic diagram of a computer system for implementing embodiments of the present disclosure.

FIG. 6 is a simplified schematic diagram of a computer system for implementing embodiments of the present disclosure. Internet 608 is used to interconnect users with servers. Users 622 access Internet 608 via a variety of the devices, such as smart phone 614, tablet 616, laptop 618, mobile phone 620, personal computer 612, etc. These are merely examples, and any other device used to access Internet 608 can be used to implement embodiments of this disclosure. For example, the devices may be wired or wireless. In one embodiment, a browser is executed on a device, and the graphical user interface is presented on a display. The browser provides the functionality for accessing the Internet.

Search server 602, also known as a web search engine, provides search features to Internet users. A web search engine is designed to search for information on the World Wide Web. The search results are generally presented in a list of results and are sometimes called hits. The information may consist of web pages, news pages, blogs pages, images, etc. Unlike web directories, which are maintained by human editors, search engines operate algorithmically, or use a mixture of algorithmic and human input.

News server 604 provides news to users. One example of a news server is Yahoo! ® News. News may originate from a variety of sources, not just from inside the search engine website. The news search engine scouts the Internet looking for news articles, which are then made available to users. Users may access the news by selecting news articles in the website of the news search engine, searching the news by entering search terms in a search field, or selecting a news category, such as politics, sports, weather, etc.

Relevant news server 606 searches news articles that are relevant to the user activity, such as when the user is reading a news article, looking at product information, reading a blog, etc. Relevant news server 606 may utilize information from news server 604, search server 602, advertising server 610, etc. Embodiments described below present methods for identifying news items that are relevant to the user's current activity.

Advertising server 610 provides ad delivery to Internet users from publishers, also referred to as advertisers. An Internet ad is a commercial message. Today there are already many established relationships between advertisers and content providers. For example, popular bloggers can make money from their blogs through advertisement placed in their blog pages. Advertisers are willing to pay content providers for attracting users to their websites, increasing brand name recognition, selling their products or services, etc.

Although different servers are described by way of example, the person skilled in the art will appreciate that multiple configurations are possible by combining several servers into one system, by having distributed systems where a single function can be accomplished by a plurality of different servers scattered across the Internet, or by caching information from the different databases at the different servers to accelerate the processing of information.

Figure 7:
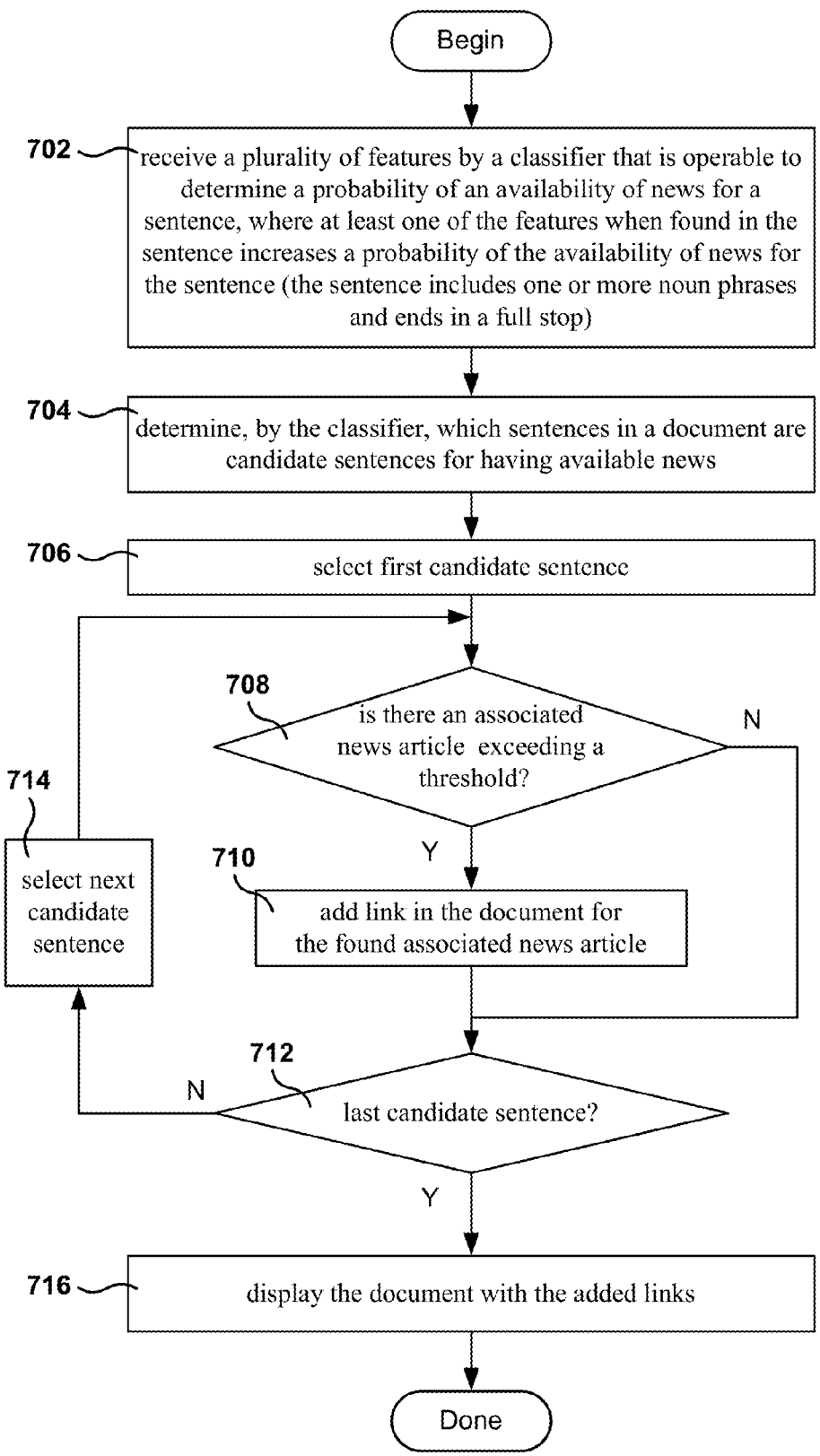
FIG. 7 shows the flow of a method for adding links to sentences in a document, in accordance with one embodiment.

FIG. 7 shows the flow of a method for adding links to sentences in a document, in accordance with one embodiment. In operation 702, a plurality of features is received by a classifier that is operable to determine the probability of the availability of news for a sentence. At least one of the features, when found in the sentence, increases the probability of the availability of news for the sentence. In one embodiment, the sentence includes, at least, one or more noun phrases and ends in a full stop.

In operation 704, the classifier determines which sentences in a document are candidate sentences for having available news, and in operation 706, the first candidate sentence is selected for determining if there is a news article associated with the sentence. The news article is associated with the sentence if the news article provides further details on the meaning of the sentence.

Possible news articles for the selected sentence are obtained, and in operation 708, a determination is made whether there is an associated news article with a score that exceeds a threshold score. The score of the associated news article measures the probability that the associated news article describes information regarding the sentence.

If there is an associated news article that exceeds the threshold score, the method continues in operation 710, where a link is added to the sentence in the document for the found associated news article. If operation 708 determines that there is no associated news article, the method continues to operation 712, where a check is performed to determine if the last candidate sentence has been evaluated. If there are more candidate sentences to be evaluated, the method flows to operation 714, and if there are no more candidate sentences the method continues to operation 716.

In operation 714, the next candidate is selected and the method returns to operation 708 to continue the search for associated news articles. After all the sentences have been evaluated, in operation 716 the document is presented to the user on a display, or some other presentation medium, where the document includes the added links.

Figure 8:
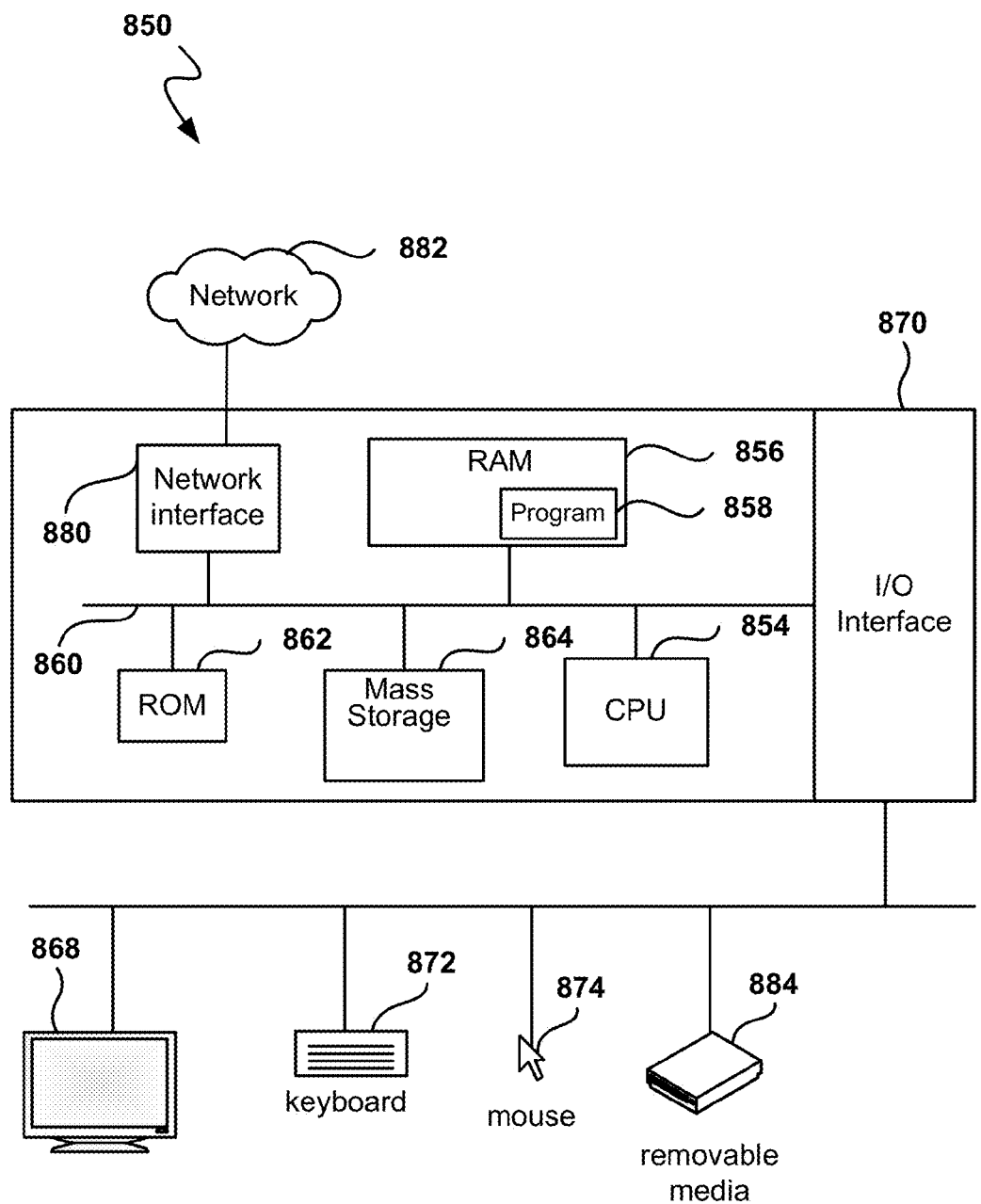
FIG. 8 is a simplified schematic diagram of a computer system for implementing embodiments of the present disclosure.

FIG. 8 is a simplified schematic diagram of a computer system for implementing embodiments of the present disclosure. FIG. 8 depicts an exemplary computer environment for implementing embodiments of the disclosure. It should be appreciated that the methods described herein may be performed with a digital processing system, such as a conventional, general-purpose computer system. Special purpose computers, which are designed or programmed to perform only one function, may be used in the alternative. The computer system includes a central processing unit (CPU) 1104, which is coupled through bus 1110 to random access memory (RAM) 1106, read-only memory (ROM) 1112, and mass storage device 1114. Computer program 1108 for searching relevant news articles resides in random access memory (RAM) 1106, but can also reside in mass storage 1114.

Mass storage device 1114 represents a persistent data storage device such as a floppy disc drive or a fixed disc drive, which may be local or remote.

Network interface 1130 provides connections via network 1132, allowing communications with other devices. It should be appreciated that CPU 1104 may be embodied in a general-purpose processor, a special purpose processor, or a specially programmed logic device. Input/Output (I/O) interface provides communication with different peripherals and is connected with CPU 1104, RAM 1106, ROM 1112, and mass storage device 1114, through bus 1110. Sample peripherals include display 1118, keyboard 1122, cursor control 1124, removable media device 1134, etc.

Display 1118 is configured to display the user interfaces described herein, such as the web pages shown in FIGS. 1 and 2. Keyboard 1122, cursor control 1124, removable media device 1134, and other peripherals are coupled to I/O interface 1120 in order to communicate information in command selections to CPU 1104. It should be appreciated that data to and from external devices may be communicated through I/O interface 1120. The embodiments can also be practiced in distributed computing environments where tasks are performed by remote processing devices that are linked through a wire-based or wireless network.

Embodiments of the present disclosure may be practiced with various computer system configurations including handheld devices, microprocessor systems, microprocessor-based or programmable consumer electronics, minicomputers, mainframe computers and the like. The embodiments may also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein that form part of the embodiments are useful machine operations. The embodiments also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for providing internet content, the method comprising:
   receiving a plurality of features by a classifier that utilizes machine learning, the classifier being operable to determine a probability of an availability of news articles for a sentence, wherein each of the features when found in the sentence increases a probability of the availability of news articles for the sentence, the sentence including one or more noun phrases and ending in a full stop;
   determining by the classifier which sentences in a document are candidate sentences for having available news articles;
   for each candidate sentence, finding an associated news article when the associated news article exceeds a threshold of relevance to the candidate sentence;
   adding links in the document to the found associated news articles;
   displaying the document with the added links;
   receiving judgments from a plurality of judges for a plurality of training sentences, wherein each judgment is a score indicating if each training sentence is a good candidate for having associated news articles; and
   training the classifier utilizing machine learning with the plurality of training sentences, the judgments, and the received plurality of features, wherein at least one operation of the method is executed through a processor.

2. The method as recited in claim 1, wherein training the classifier further includes:
   identifying a value for each feature, when found in the sentence, towards determining the availability of news articles for the sentence.

3. The method as recited in claim 1, wherein determining which sentences are candidate sentences further includes:
   appraising each sentence with the classifier based on the sentence and the plurality of features; and
   determining if each sentence is a candidate sentence based on the appraising.

4. The method as recited in claim 1, wherein finding the associated news article further includes:
   eliminating news as possible associated news articles when the news are duplicates of the document.

5. The method as recited in claim 1, wherein the associated news article provides news associated with a corresponding sentence.

6. The method as recited in claim 1, wherein operations of the method are performed by a computer program when executed by one or more processors, the computer program being embedded in a non-transitory computer-readable storage medium.

7. The method as recited in claim 1, wherein each sentence in the document starts with a capital letter and includes one or more verbs.

8. A method for providing internet content, the method comprising:
   receiving a plurality of features by a classifier that utilizes machine learning, the classifier being operable to determine a probability of an availability of news articles for a sentence, wherein each of the features when found in the sentence increases a probability of the availability of news articles for the sentence, the sentence including one or more noun phrases and ending in a full stop;
   determining by the classifier which sentences in a document are candidate sentences for having available news articles;
   for each candidate sentence, finding an associated news article when the associated news article exceeds a threshold of relevance to the candidate sentence;
   adding links in the document to the found associated news articles; and
   displaying the document with the added links, wherein finding the associated news article further includes:
      for each candidate sentence, performing a search on the candidate sentence to find potential news articles;
      evaluating each potential news article against the candidate sentence to obtain a score for each potential news article based on a probability that the potential news article has information about the candidate sentence; and
      selecting a best potential news article with a highest score when the score of the best potential news article exceeds a threshold score, wherein at least one operation of the method is executed through a processor.

9. The method as recited in claim 8, wherein evaluating each potential news article further includes:
   comparing words in the sentence to words in a title and abstract of the potential news article.

10. The method as recited in claim 8, wherein evaluating each potential news article further includes:
    comparing words in the sentence to words in a title, abstract, and body of the potential news article.

11. The method as recited in claim 8, wherein evaluating each potential news article further includes:
    utilizing a relevance model to evaluate the potential news article against the sentence.

12. The method as recited in claim 8, wherein the search is limited to news articles occurring within a time period having a predetermined time length of time and ending in a current time.

13. The method as recited in claim 8, wherein adding links in the document further includes:
    adding a link in each candidate sentence with the associated news article to the associated news article, the link being added to a plurality of words in the candidate sentence, the plurality of words including a verb and a noun phrase.

14. A computer program embedded in a non-transitory computer-readable storage medium, when executed by one or more processors, for providing internet content, the computer program comprising:
    program instructions for receiving a plurality of features by a classifier that is operable to determine a probability of an availability of news for a sentence, wherein at least one of the features when found in the sentence increases a probability of the availability of news for the sentence, the sentence including one or more noun phrases and ending in a full stop;
    program instructions for determining by the classifier which sentences in a document are candidate sentences for having available news;
    program instructions for finding, for each candidate sentence, an associated news article when the associated news article exceeds a threshold of relevance to the candidate sentence, wherein finding the associated news article further includes:

program instructions for performing, for each candidate sentence, a search on the candidate sentence to find potential news articles;

program instructions for evaluating each potential news article against the candidate sentence; and program instructions for selecting a best potential news article based on the evaluation to be the associated news article when a score of the best potential news article exceeds a threshold score;

program instructions for adding links in the document to the found associated news articles; and program instructions for displaying the document with the added links.

15. The computer program as recited in claim 14, wherein determining which sentences are candidate sentences further includes:

program instructions for appraising each sentence with the classifier based on the sentence and the plurality of features; and program instructions for determining if each sentence is a candidate sentence based on the appraising.

16. The computer program as recited in claim 14, wherein the features are selected from a group consisting of a date, a verb in the past tense, a proper name in the sentence, a name of a celebrity, a name of a media outlet, a name of a crime, or a title.

17. The computer program as recited in claim 14, wherein adding links in the document further includes:

program instructions for adding a link in each candidate sentence with the associated news article to the associated news article, the link being added to a plurality of words in the candidate sentence, the plurality of words including a verb.

\* \* \* \* \*